United States Patent
Schena et al.

(10) Patent No.: US 7,656,388 B2
(45) Date of Patent: Feb. 2, 2010

(54) CONTROLLING VIBROTACTILE SENSATIONS FOR HAPTIC FEEDBACK DEVICES

(75) Inventors: Bruce M. Schena, Menlo Park, CA (US); Erik Shahoian, San Ramon, CA (US)

(73) Assignee: Immersion Corporation, San Jose, CA (US)

( * ) Notice: Subject to any disclaimer, the term of this patent is extended or adjusted under 35 U.S.C. 154(b) by 824 days.

(21) Appl. No.: 10/949,467

(22) Filed: Sep. 27, 2004

(65) Prior Publication Data

US 2005/0219206 A1 Oct. 6, 2005

Related U.S. Application Data

(63) Continuation-in-part of application No. 09/608,125, filed on Jun. 30, 2000, now abandoned.

(60) Provisional application No. 60/142,155, filed on Jul. 1, 1999.

(51) Int. Cl.
G09G 5/00 (2006.01)
G09G 5/08 (2006.01)
(52) U.S. Cl. .................. 345/158; 345/156; 715/701; 715/702
(58) Field of Classification Search ............ 345/156, 345/158; 715/701, 702; 463/36–38
See application file for complete search history.

(56) References Cited

U.S. PATENT DOCUMENTS

| | | | |
|---|---|---|---|
| 2,972,140 A | 2/1961 | Hirsch | |
| 3,157,853 A | 11/1964 | Hirsch | |
| 3,220,121 A | 11/1965 | Cutler | |
| 3,497,668 A | 2/1970 | Hirsch | |
| 3,517,446 A | 6/1970 | Corlyon et al. | |
| 3,623,064 A | 11/1971 | Kagan | |
| 3,902,687 A | 9/1975 | Hightower | |
| 3,903,614 A | 9/1975 | Diamond et al. | |
| 3,911,416 A | 10/1975 | Feder | |
| 3,919,691 A | 11/1975 | Noll | |

(Continued)

FOREIGN PATENT DOCUMENTS

DE 4400790 A1 5/1995

(Continued)

OTHER PUBLICATIONS

Patrick, "Design, Construction, and Testing of a Fingertip Tactile Display for Interaction with Virtual and Remote Environments," *Master of Science Thesis*, MIT, Aug. 1990, archived Nov. 8, 1990.

(Continued)

*Primary Examiner*—Kevin M Nguyen
(74) *Attorney, Agent, or Firm*—Kilpatrick Stockton LLP (57) ABSTRACT

Method and apparatus for controlling vibrotactile sensations for haptic feedback devices. An actuator in a haptic feedback device includes a rotatable eccentric mass, and information is received at the haptic feedback device causing a drive signal. The drive signal controls the actuator to oscillate the mass in two directions about an axis of rotation of the actuator such that the oscillation of the mass induces a vibration in the haptic feedback device. The magnitude and frequency of the vibration can be independently controlled by adjusting a magnitude and a frequency, respectively, of the drive signal. The vibrations can also be provided in a bi-directional mode or uni-directional mode to provide the most efficient magnitude of the vibrotactile sensations. The haptic feedback device can be, for example, a gamepad controller receiving commands from a host computer providing a graphical environment.

21 Claims, 5 Drawing Sheets

U.S. PATENT DOCUMENTS

| | | |
|---|---|---|
| 4,127,752 A | 11/1978 | Lowthorp |
| 4,160,508 A | 7/1979 | Frosch et al. |
| 4,236,325 A | 12/1980 | Hall et al. |
| 4,262,549 A | 4/1981 | Schwellenbach |
| 4,333,070 A | 6/1982 | Barnes |
| 4,382,217 A | 5/1983 | Horner et al. |
| 4,414,984 A | 11/1983 | Zarudiansky |
| 4,464,117 A | 8/1984 | Foerst |
| 4,484,191 A | 11/1984 | Vavra |
| 4,513,235 A | 4/1985 | Acklam et al. |
| 4,581,491 A | 4/1986 | Boothroyd |
| 4,599,070 A | 7/1986 | Hladky et al. |
| 4,706,294 A | 11/1987 | Ouchida |
| 4,708,656 A | 11/1987 | de Vries et al. |
| 4,713,007 A | 12/1987 | Alban |
| 4,731,603 A | 3/1988 | McRae et al. |
| 4,794,392 A | 12/1988 | Selinko |
| 4,795,296 A | 1/1989 | Jau |
| 4,868,549 A | 9/1989 | Affinito et al. |
| 4,885,565 A | 12/1989 | Embach |
| 4,891,764 A | 1/1990 | McIntosh |
| 4,897,582 A | 1/1990 | Otten et al. |
| 4,930,770 A | 6/1990 | Baker |
| 4,934,694 A | 6/1990 | McIntosh |
| 5,019,761 A | 5/1991 | Kraft |
| 5,022,384 A | 6/1991 | Freels |
| 5,022,407 A | 6/1991 | Horch et al. |
| 5,035,242 A | 7/1991 | Franklin et al. |
| 5,038,089 A | 8/1991 | Szakaly |
| 5,078,152 A | 1/1992 | Bond et al. |
| 5,103,404 A | 4/1992 | McIntosh |
| 5,107,262 A | 4/1992 | Cadoz et al. |
| 5,146,566 A | 9/1992 | Hollis, Jr. et al. |
| 5,165,897 A | 11/1992 | Johnson |
| 5,175,459 A | 12/1992 | Danial et al. |
| 5,184,319 A | 2/1993 | Kramer |
| 5,186,629 A | 2/1993 | Rohen |
| 5,186,695 A | 2/1993 | Mangseth et al. |
| 5,194,786 A | 3/1993 | Smith et al. |
| 5,203,563 A | 4/1993 | Loper, III |
| 5,212,473 A | 5/1993 | Louis |
| 5,240,417 A | 8/1993 | Smithson et al. |
| 5,271,290 A | 12/1993 | Fischer |
| 5,275,174 A | 1/1994 | Cook |
| 5,283,970 A | 2/1994 | Aigner |
| 5,296,871 A | 3/1994 | Paley |
| 5,299,810 A | 4/1994 | Pierce et al. |
| 5,309,140 A | 5/1994 | Everett, Jr. et al. |
| 5,334,027 A | 8/1994 | Wherlock |
| 5,334,893 A | 8/1994 | Oudet et al. |
| 5,354,162 A | 10/1994 | Brudea et al. |
| 5,388,992 A | 2/1995 | Franklin et al. |
| 5,399,091 A | 3/1995 | Mitsumoto |
| 5,405,152 A | 4/1995 | Katanics et al. |
| 5,436,622 A | 7/1995 | Gutman et al. |
| 5,437,607 A | 8/1995 | Taylor |
| 5,440,183 A | 8/1995 | Denne |
| 5,456,341 A | 10/1995 | Garnjost et al. |
| 5,466,213 A | 11/1995 | Hogan et al. |
| 5,547,382 A | 8/1996 | Yamasaki et al. |
| 5,565,840 A | 10/1996 | Thorner et al. |
| 5,575,761 A | 11/1996 | Hajianpour |
| 5,580,251 A | 12/1996 | Gilkes et al. |
| 5,583,478 A | 12/1996 | Renzi |
| 5,587,937 A | 12/1996 | Massie et al. |
| 5,589,828 A | 12/1996 | Armstrong |
| 5,619,180 A | 4/1997 | Massimino et al. |
| 5,631,861 A | 5/1997 | Kramer |
| 5,643,087 A | 7/1997 | Marcus et al. |
| 5,649,020 A | 7/1997 | McClurg et al. |
| 5,661,446 A | 8/1997 | Anderson et al. |
| 5,669,818 A | 9/1997 | Thorner et al. |
| 5,684,722 A | 11/1997 | Thorner et al. |
| 5,690,582 A | 11/1997 | Ulrich et al. |
| 5,691,898 A | 11/1997 | Rosenberg et al. |
| 5,709,219 A | 1/1998 | Chen et al. |
| 5,714,978 A | 2/1998 | Yamanaka et al. |
| 5,731,804 A | 3/1998 | Rosenberg |
| 5,734,236 A | 3/1998 | Motegi |
| 5,734,373 A | 3/1998 | Rosenberg et al. |
| 5,736,978 A | 4/1998 | Hasser et al. |
| 5,739,811 A | 4/1998 | Rosenberg et al. |
| 5,742,278 A | 4/1998 | Chen et al. |
| 5,754,023 A | 5/1998 | Roston et al. |
| 5,766,016 A | 6/1998 | Sinclair et al. |
| 5,781,172 A | 7/1998 | Engel et al. |
| 5,784,052 A | 7/1998 | Keyson |
| 5,785,630 A | 7/1998 | Bobick et al. |
| 5,790,108 A | 8/1998 | Salcudean et al. |
| 5,805,140 A | 9/1998 | Rosenberg et al. |
| 5,828,197 A | 10/1998 | Martin et al. |
| 5,857,986 A | 1/1999 | Moriyasu |
| 5,889,672 A | 3/1999 | Schuler et al. |
| 5,894,263 A | 4/1999 | Shimakawa et al. |
| 5,896,076 A | 4/1999 | van Namen |
| 5,897,437 A | 4/1999 | Nishiumi et al. |
| 5,914,705 A | 6/1999 | Johnson et al. |
| 5,945,772 A | 8/1999 | Macnak et al. |
| 5,952,806 A | 9/1999 | Muramatsu |
| 5,973,670 A | 10/1999 | Barber et al. |
| 5,984,880 A | 11/1999 | Lander et al. |
| 5,986,643 A | 11/1999 | Harvill et al. |
| 6,001,014 A | 12/1999 | Ogata et al. |
| 6,004,134 A | 12/1999 | Marcus et al. |
| 6,044,646 A | 4/2000 | Silverbrook |
| 6,057,753 A | 5/2000 | Myers |
| 6,078,126 A | 6/2000 | Rollins et al. |
| 6,088,017 A * | 7/2000 | Tremblay et al. ............ 345/156 |
| 6,088,019 A | 7/2000 | Rosenberg |
| 6,104,158 A | 8/2000 | Jacobus et al. |
| 6,111,577 A | 8/2000 | Zilles et al. |
| 6,160,489 A | 12/2000 | Perry et al. |
| 6,171,191 B1 | 1/2001 | Ogata et al. |
| 6,184,868 B1 | 2/2001 | Shahoian et al. |
| 6,198,206 B1 | 3/2001 | Saarmaa et al. |
| 6,211,861 B1 | 4/2001 | Rosenberg et al. |
| 6,216,059 B1 | 4/2001 | Ierymenko |
| 6,219,032 B1 | 4/2001 | Rosenberg et al. |
| 6,252,579 B1 | 6/2001 | Rosenberg et al. |
| 6,256,011 B1 | 7/2001 | Culver |
| 6,268,671 B1 | 7/2001 | Furuki |
| 6,275,213 B1 | 8/2001 | Tremblay et al. |
| RE37,374 E | 9/2001 | Roston et al. |
| 6,283,859 B1 * | 9/2001 | Carlson et al. ................ 463/36 |
| 6,317,032 B1 | 11/2001 | Oishi |
| 6,420,806 B2 | 7/2002 | Wittig |
| 6,422,941 B1 | 7/2002 | Thorner et al. |
| 6,424,333 B1 | 7/2002 | Tremblay et al. |
| 6,467,469 B2 * | 10/2002 | Yang et al. ............ 123/568.21 |
| 6,639,581 B1 | 10/2003 | Moore et al. |
| 6,686,901 B2 | 2/2004 | Rosenberg |
| 6,697,043 B1 | 2/2004 | Shahoian |
| 6,717,573 B1 | 4/2004 | Shahoian et al. |
| 2002/0030663 A1 | 3/2002 | Tierling et al. |

FOREIGN PATENT DOCUMENTS

| | | |
|---|---|---|
| EP | 0265011 | 4/1988 |
| EP | 0 349 086 A1 | 1/1990 |
| EP | 0626634 A2 | 5/1994 |
| EP | 0607580 A1 | 7/1994 |
| JP | S62-194389 | 12/1987 |
| JP | H2-185278 | 7/1990 |
| JP | 07096016 | 4/1991 |

| | | |
|---|---|---|
| JP | 4008381 | 1/1992 |
| JP | H4-8381 | 1/1992 |
| JP | H5-192449 | 8/1993 |
| JP | 702147 | 1/1995 |
| JP | H7-24147 | 1/1995 |
| WO | WO 92/00559 | 1/1992 |
| WO | WO 93/08517 | 4/1993 |
| WO | WO 97/31333 | 8/1997 |
| WO | WO 98/32112 | 8/1998 |
| WO | WO 99/40504 | 8/1999 |
| WO | WO 01/03105 | 1/2001 |
| WO | WO 01/13354 | 2/2001 |
| WO | WO 01/24158 | 5/2001 |

OTHER PUBLICATIONS

Calder, "Design of A Force-Feedback Touch-Introducing Actuator For Teleoperator Robot Control," *Bachelor of Science Thesis*, MIT, May 1983, archived Jun. 23, 1983.

Wiker, "Teletouch Display Development: Phase 1 Report," *Technical Report 1230*, Naval Ocean Systems Center, San Diego, Jul. 1988.

Bliss, "Optical-to-Tactile Image Conversion for the Blind," *IEEE Transactions on Man-Machine Systems*, vol. MMS-11, No. 1, Mar. 1970.

Johnson, "Shape-Memory Alloy Tactile Feedback Actuator," *Armstrong Aerospace Medical Research Laboratory*, AAMRL-TR-90-039, Aug. 1990.

Kontarinis et al., "Tactile Display of Vibratory Information in Teleoperation and Virtual Environments," PRESENCE, 4(4):387-402, Harvard Univ., 1995.

Aukstakalnis et al., "Silicon Mirage: The Art and Science of Virtual Reality," ISBN 0-938151-82-7, pp. 129-180, 1992.

Eberhardt et al., "Inducing Dynamic Haptic Perception by The Hand: System Description and Some Results," DSC-vol. 55-1, *Dynamic Systems and Control*: vol. 1, ASME 1994.

Gobel et al., "Tactile Feedback Applied to Computer Mice," *International Journal of Human-Computer Interaction*, vol. 7, No. 1, pp. 1-24, 1995.

Pimentel et al., "Virtual Reality: through the new looking glass," $2^{nd}$ Edition; McGraw-Hill, ISBN 0-07-050167-X, pp. 41-202, 1994.

"Cyberman Technical Specification," *Logitech Cyberman SWIFT Supplement to Logitech Mouse Technical Reference and Programming Guide*, Apr. 5, 1994.

Ouhyoung et al., "The Development of A Low-Cost Force Feedback Joystick and Its Use in the Virtual Reality Environment," *Proceedings of the Third Pacific Conference on Computer Graphics and Applications, Pacific Graphics '95*, Seoul, Korea, Aug. 21-24, 1995.

Lake, "Cyberman from Logitech," at http://www.ibiblio.org/GameBytes/issue21/greviews/cyberman.html, 1994.

"Component Maintenance Manual With Illustrated Parts List, Coaxial Control Shaker Part No. C-25502," Safe Flight Instrument Corporation, Revised Jan. 28, 2002 (3 pages).

"Technical Manual Overhaul Instructions With Parts Breakdown, Coaxial Control Shaker Part No. C-25502," Safe Flight Instrument Corporation, Revised Jul. 15, 1980 (23 pages).

Scannell, "Taking a Joystick Ride," *Computer Currents*, Boston Edition, vol. 9, No. 11, Nov. 1994.

Yamakita et al., "Tele-Virtual Reality of Dynamic Mechanical Model," *Proceedings of the 1992 IEEE/RSJ International Conference on Intelligent Robots and Systems*, Raleigh, NC, Jul. 7-10, 1992.

Noll, "Man-Machine Tactile," *SID Journal*, Jul./Aug. 1972 Issue.

Rosenberg, "Virtual Fixtures: Perceptual Overlays Enhance Operator Performance In Telepresence Tasks," *Ph.D. Dissertation*, Stanford University, Jun. 1994.

Baigrie, "Electric Control Loading—A Low Cost, High Performance Alternative," *Proceedings of Interservice/Industry Training Systems Conference*, pp. 247-254, Nov. 6-8, 1990.

Iwata, "Pen-based Haptic Virtual Environment," 0-7803-1363-1/93 IEEE, pp. 287-292, 1993.

Russo, "The Design and Implementation of a Three Degree of Freedom Force Output Joystick," *MIT Libraries Archives* pp. 1-131, May 1990, archived Aug. 14, 1990.

Brooks et al., "Hand Controllers for Teleoperation—A State-of-the-Art Technology Survey and Evaluation," *JPL Publication 85-11*, NASA-CR-175890; N85-28559, pp. 1-84, Mar. 1, 1985.

Jones et al., "A perceptual analysis of stiffness," ISSN 0014-4819 Springer International (Springer-Verlag); *Experimental Brain Research*, vol. 79, No. 1, pp. 150-156, 1990.

Burdea et al., "Distributed Virtual Force Feedback, Lecture Notes for Workshop on Force Display in Virtual Environments and its Application to Robotic Teleoperation," *1993 IEEE International Conference on Robotics and Automation*, pp. 25-44, May 2, 1993.

Snow et al., "Model-X Force-Reflecting-Hand-Controller," NT Control No. NPO-17851; JPL Case No. 7348, pp. 1-4 with 45 pages of attachments, Jun. 15, 1989.

Ouh-Young, "Force Display in Molecular Docking," Doctoral Dissertation, University of North Carolina at Chapel Hill, UMI Order No. 9034744, p. 1-369, 1990.

Tadros, "Control System Design for a Three Degree of Freedom Virtual Environment Simulator Using Motor/Brake Pair Actuators," *MIT Archive*, pp. 1-88, Feb. 1990, archived Aug. 13, 1990.

Caldwell et al., "Enhanced Tactile Feedback (Tele-Taction) Using a Multi-Functional Sensory System," 1050-4729/93, pp. 955-960, 1993.

Adelstein et al., "Design and Implementation of a Force Reflecting Manipulandum for Manual Control research," DSC-vol. 42, *Advances in Robotics*, pp. 1-12, 1992.

Stanley et al., "Computer Simulation of Interacting Dynamic Mechanical Systems Using Distributed Memory Parallel Processors," DSC-vol. 42, *Advances in Robotics*, pp. 55-61, ASME 1992.

Russo, "Controlling Dissipative Magnetic Particle Brakes in Force Reflective Devices," DSC-vol. 42, *Advances in Robotics*, pp. 63-70, ASME 1992.

Kontarinis et al., "Display of High-Frequency Tactile Information to Teleoperators," *Telemanipulator Technology and Space Telerobotics*, Won S. Kim, Editor, Proc. SPIE vol. 2057, pp. 40-50, Sep. 7-9, 1993.

Patrick et al., "Design and Testing of A Non-reactive, Fingertip, Tactile Display for Interaction with Remote Environments," *Cooperative Intelligent Robotics in Space*, Rui J. deFigueiredo et al, Editor, Proc. SPIE vol. 1387, pp. 215-222, 1990.

Adelstein, "A Virtual Environment System For The Study of Human Arm Tremor," *Ph.D. Dissertation*, Dept. of Mechanical Engineering, MIT, Jun. 1989, archived Mar. 13, 1990.

Bejczy, "Sensors, Controls, and Man-Machine Interface for Advanced Teleoperation," *Science*, vol. 208, No. 4450, pp. 1327-1335, 1980.

Bejczy et al., "Generalization of Bilateral Force-Reflecting Control of Manipulators," *Proceedings Of Fourth CISM-IFToMM*, Sep. 8-12, 1981.

McAffee et al., "Teleoperator Subsystem/Telerobot Demonstrator: Force Reflecting Hand Controller Equipment Manual," *JPL* 1988, JPL D-5172.

Minsky, "Computational Haptics: The Sandpaper System for Synthesizing Texture for a Force-Feedback Display," *Ph.D. Dissertation*, MIT, Jun. 1995, archived Jul. 6, 1995.

Jacobsen et al., "High Performance, Dextrous Telerobotic Manipulator With Force Reflection," *Intervention/ROV '91 Conference & Exposition*, Hollywood, Florida, May 21-23, 1991.

Shimoga, "Finger Force and Touch Feedback Issues in Dexterous Telemanipulation," *Proceedings of Fourth Annual Conference on Intelligent Robotic Systems for Space Exploration*, Rensselaer Polytechnic Institute, Sep. 30-Oct. 1, 1992.

IBM Technical Disclosure Bulletin, "Mouse Ball-Actuating Device With Force and Tactile Feedback," vol. 32, No. 9B, Feb. 1990.

Terry et al., "Tactile Feedback In A Computer Mouse," *Proceedings of Fourteenth Annual Northeast Bioengineering Conference*, University of New Hampshire, Mar. 10-11, 1988.

Howe, "A Force-Reflecting Teleoperated Hand System for the Study of Tactile Sensing in Precision Manipulation," *Proceedings of the 1992 IEEE International Conference on Robotics and Automation*, Nice, France, May 1992.

Eberhardt et al., "OMAR—A Haptic display for speech perception by deaf and deaf-blind individuals," *IEEE Virtual Reality Annual International Symposium*, Seattle, WA, Sep. 18-22, 1993.

Rabinowitz et al., "Multidimensional tactile displays: Identification of vibratory intensity, frequency, and contractor area," *Journal of The Acoustical Society of America*, vol. 82, No. 4, Oct. 1987.

Bejczy et al., "Kinesthetic Coupling Between Operator and Remote Manipulator," *International Computer Technology Conference, The American Society of Mechanical Engineers*, San Francisco, CA, Aug. 12-15, 1980.

Bejczy et al., "A Laboratory Breadboard System For Dual-Arm Teleoperation," *SOAR '89 Workshop, JSC*, Houston, TX, Jul. 25-27, 1989.

Ouhyoung et al., "A Low-Cost Force Feedback Joystick and Its Use in PC Video Games," *IEEE Transactions on Consumer Electronics*, vol. 41, No. 3, Aug. 1995.

Marcus, "Touch Feedback in Surgery," *Proceedings of Virtual Reality and Medicine The Cutting Edge*, Sep. 8-11, 1994.

Bejczy, et al., "Universal Computer Control System (UCCS) For Space Telerobots," CH2413-3/87/0000/0318501.00 1987 IEEE, 1987.

Schmult et al., "Application Areas for a Force-Feedback Joystick," ASME 1993, DSC-vol. 49, pp. 47-54.

Hasser, Christopher John, "Tactile Feedback for a Force-Reflecting Haptic Display," The School of Engineering, University of Dayton, Dec. 1995, pp. iii-xii & 1-96.

Akamatsu, M. et al., "Multimodal Mouse: A Mouse-Type Device with Tactile and Force Display," Presence, vol. 3, No. 1, 1994, pp. 73-80.

Kelly, A. J. et al., "MagicMouse: Tactile and Kinesthetic Feedback in the Human-Computer Interface using an Electromagnetically Actuated Input/Output Device," Dept. of Elec. Eng., Univ. of Brit. Columbia, 1993, pp. 1-27.

Hasser, C. et al., "Tactile Feedback with Adaptive Controller for a Force-Reflecting Haptic Display," Parts 1&2, IEEE 0-7803-3131-1, 1996, pp. 526-533.

Ramstein, C., "Combining Haptic and Braille Technologies: Design Issues and Pilot Study," ASSETS '96, $2^{nd}$ Annual ACM Conf. On Assitive Technologies, 1996, pp. 37-44.

Dennerlein, et al., "Vibrotactile Feedback for Industrial Telemanipulators," ASME IMECE, $6^{th}$ Annual Symp. On Haptic Interfaces for Virtual Environment and Teleoperator Systems, Nov. 1997, pp. 1-7.

Minsky, Margaret et al., "Feeling and Seeing: Issues in Force Display," ACM 089791-351-5, 1990, pp. 235-242.

Ouh-young, M. et al., "Creating an Illustion of Feel: Control Issues in Force Display," Computer Science Dept., Univ. of N. Carolina, 1989, pp. 1-14.

Hasser, C., "Force-Reflecting Anthropomorphic Hand Maters," AL/CF-TR-1995-0110, pp. 5-31.

Kim, Won, "Telemanipulator Technology and Space Telerobotics," SPIE Proceedings, 1993, vol. 2057, pp. 40-50.

Kaczmarek, K. et al., "Tactile Displays," Virtual Environments and Advanced Interface Design, edited Barfield et al., 1995, pp. 349-414.

Patrick, N. et al., "Design and Testing of a Non-reactive, fingertip, tactile display for interaction with remote environments," Cooperative Intelligent Robotics in Space, SPIE Proceedings, vol. 1387, 1990, pp. 215-222.

* cited by examiner

FIG. 5B

CONTROLLING VIBROTACTILE SENSATIONS FOR HAPTIC FEEDBACK DEVICES

CROSS REFERENCE TO RELATED APPLICATIONS

This application is a Continuation-in-Part of U.S. application Ser. No. 09/608,125, filed Jun. 30, 2000, now abandoned which claims the benefit of U.S. Provisional Application No. 60/142,155, filed Jul. 1, 1999, entitled, "Providing Vibration Forces in Force Feedback Devices," each of which is incorporated by reference herein in its entirety.

BACKGROUND OF THE INVENTION

The present invention relates generally to producing forces in haptic feedback interface devices, and more particularly to the output and control of vibrations and similar force sensations from actuators in a haptic feedback interface device.

Using an interface device, a user can interact with an environment displayed by a computer system to perform functions and tasks on the computer, such as playing a game, experiencing a simulation or virtual reality environment, using a computer aided design system, operating a graphical user interface (GUI), or otherwise influencing events or images depicted on the screen. Common human-computer interface devices used for such interaction include a joystick, mouse, trackball, steering wheel, stylus, tablet, pressure-sensitive ball, or the like, that is connected to the computer system controlling the displayed environment.

In some interface devices, force feedback or tactile feedback is also provided to the user, also known more generally herein as "haptic feedback." These types of interface devices can provide physical sensations which are felt by the user using the controller or manipulating the physical object of the interface device. One or more motors or other actuators are used in the device and are connected to the controlling computer system. The computer system controls forces on the haptic feedback device in conjunction and coordinated with displayed events and interactions on the host by sending control signals or commands to the haptic feedback device and the actuators.

Many low cost haptic feedback devices provide forces to the user by vibrating the manipulandum and/or the housing of the device that is held by the user. The output of simple vibration haptic feedback (tactile sensations) requires less complex hardware components and software control over the force-generating elements than does more sophisticated haptic feedback. One or more motors are mounted in the housing of the devices and are energized to provide the vibration forces. An eccentric mass is positioned on the shaft of each motor, and the shaft is rotated quickly to cause the motor and the housing of the device to vibrate. One problem with these currently-available implementations of vibration haptic feedback devices is that the vibrations that these implementations produce are limited.

SUMMARY OF THE INVENTION

The present invention is directed to controlling vibrotactile sensations in haptic feedback devices which are interfaced with a host application program. The present invention allows more varied and complex sensations to be provided using inexpensive electronics and mechanical parts.

More specifically, the present invention relates to a method for providing a vibration for a haptic feedback device. An actuator in a haptic feedback device is provided and includes a rotatable mass, and a drive signal is received at the haptic feedback device. The drive signal controls the actuator to oscillate the mass in two directions about an axis of rotation of the actuator such that the oscillation of the mass induces a vibration in the haptic feedback device. The magnitude and frequency of the vibration can be independently controlled by adjusting a magnitude and a frequency, respectively, of the drive signal.

The mass of the actuator can be an eccentric mass, and the oscillation can be accomplished in a bi-directional mode, where a different drive signal is provided to the actuator in a uni-directional mode to rotate the eccentric mass in a single direction about the axis of rotation of the shaft. The uni-directional mode can be used to output high magnitude, low frequency vibrotactile effects, and the bi-directional mode can be used to output high frequency vibrotactile effects. The haptic feedback device can be a gamepad controller receiving commands from a host computer which determines when the vibration is to be output based on events occurring within a graphical environment implemented and displayed by the computer.

Another aspect of the invention is concerned with a method for commanding a vibration for a haptic feedback device from a host computer that implements a graphical environment. An indication to output information to cause a haptic effect to be output to a user of the haptic feedback device. The indication is caused by an event or interaction occurring in the graphical environment of the host computer. Information is provided to the haptic feedback device and includes a magnitude and a frequency that are independently adjustable. An actuator is caused to oscillate a mass about an axis of rotation in two directions to cause a vibration in the haptic feedback device, where a magnitude and a frequency of the vibration is based on the magnitude and frequency included in the information. The indication to output the information can be received by a force feedback driver program running on the host computer, or another software layer. The information provided to the haptic feedback device can be a command including parameters describing the magnitude and frequency, or can be a drive signal which is provided to the actuator.

In another aspect, a haptic feedback device provides vibrotactile sensations to a user, is coupled to a host computer and includes a housing and an actuator coupled to the housing and including a mass, wherein said mass can be rotated by the actuator. The device also includes a circuit for driving the actuator in two directions, the circuit receiving a drive signal and causing the actuator to oscillate the mass and induce a vibration in the housing. The vibration is experienced by the user as vibrotactile sensations. The mass can be an eccentric mass positioned offset on the rotating shaft. The circuit for driving the actuator can include an H-bridge circuit or can include two linear amplifiers. The haptic feedback device can be a gamepad controller that receives information from the host which determines when the vibrotactile sensations are to be output based on events occurring within a graphical environment implemented and displayed by the host computer.

The present invention advantageously provides a haptic feedback device that can output a wide variety of vibrotactile sensations. Both the frequency and amplitude of the vibrations can be controlled using bi-directional control features, allowing a much wider range of sensations to be experienced by the user than in the uni-directional prior art devices. Furthermore, the device is low in cost to produce and is thus quite suitable for home consumer applications.

These and other advantages of the present invention will become apparent to those skilled in the art upon a reading of the following specification of the invention and a study of the several Figures of the drawings.

DETAILED DESCRIPTION OF PREFERRED EMBODIMENTS

Figure 1:
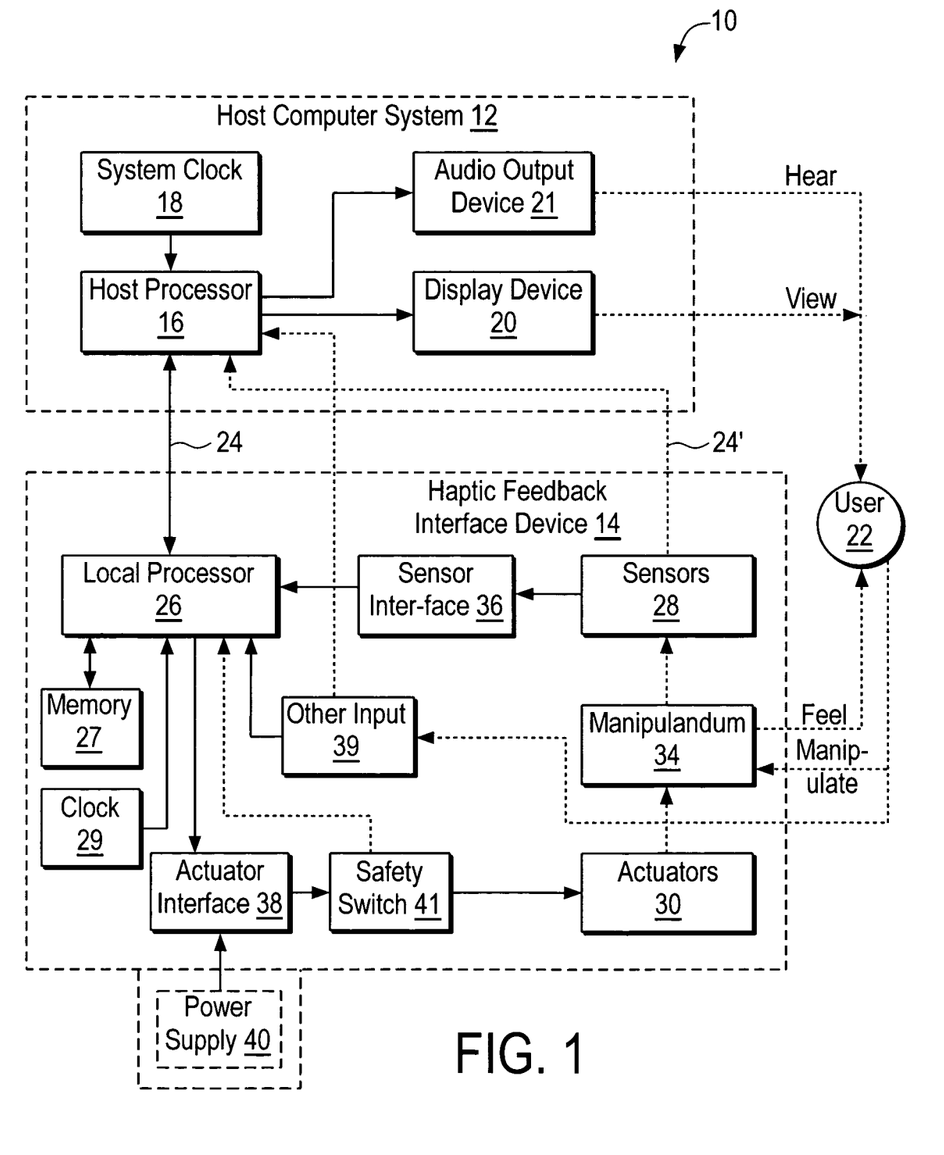
FIG. 1 is a block diagram of a haptic feedback system suitable for use with the present invention.

FIG. 1 is a block diagram illustrating a force feedback interface system 10 for use with the present invention controlled by a host computer system. Interface system 10 includes a host computer system 12 and an interface device 14.

Host computer system 12 can be any of a variety of computer systems. Other types of computers may also be used, such as a personal computer (PC, Macintosh, etc.), a television "set top box" or a "network computer," a workstation, a portable and/or handheld game device or computer, etc. Host computer system 12 preferably implements a host application program with which a user 22 is interacting via peripherals and interface device 14. For example, the host application program can be a video or computer game, medical simulation, scientific analysis program, operating system, graphical user interface, or other application program that utilizes force feedback. Typically, the host application provides images to be displayed on a display output device, as described below, and/or other feedback, such as auditory signals. The host application, or a driver program, API or other layer running on the host computer, preferably sends out information to cause haptic feedback to the user on the device 14, as described below, based on events or interactions occurring within the host application. For example, when a user-controlled vehicle collides with a fence in a game or simulation, a vibration can be output to the user to enhance the interactive experience of the collision. Similarly, when a user-controlled cursor moves onto another object such as an icon or text heading, vibrations can be used to inform the user of the interaction.

Host computer system 12 preferably includes a host microprocessor 16, a clock 18, a display screen 20, and an audio output device 21. Microprocessor 16 can be one or more of any of well-known microprocessors. Random access memory (RAM), read-only memory (ROM), and input/output (I/O) electronics are preferably also included in the host computer. Display screen 20 can be used to display images generated by host computer system 12 or other computer systems, and can be a standard display screen, television, CRT, flat-panel display, 2-D or 3-D display goggles, or any other visual interface. Audio output device 21, such as speakers, is preferably coupled to host microprocessor 16 via amplifiers, filters, and other circuitry well known to those skilled in the art and provides sound output to user 22 from the host computer 12. Other types of peripherals can also be coupled to host processor 16, such as storage devices (hard disk drive, CD ROM/DVD-ROM drive, floppy disk drive, etc.), communication devices, printers, and other input and output devices. Data for implementing the interfaces of the present invention can be stored on computer readable media such as memory (RAM or ROM), a hard disk, a CD-ROM or DVD-ROM, etc.

An interface device 14 is coupled to host computer system 12 by a bi-directional bus 24. Interface device 14 can be a gamepad controller, joystick controller, mouse controller, steering wheel controller, or other device which a user may manipulate to provide input to the computer system and experience force feedback. The bi-directional bus sends signals in either direction between host computer system 12 and the interface device. An interface port of host computer system 12, such as an RS232 or Universal Serial Bus (USB) serial interface port, parallel port, game port, etc., connects bus 24 to host computer system 12. Alternatively, a wireless communication link can be used.

Interface device 14 includes a local microprocessor 26, sensors 28, actuators 30, a user object 34, optional sensor interface 36, an actuator interface 38, and other optional input devices 39. Local microprocessor 26 is coupled to bus 24 and is considered local to interface device 14 and is dedicated to force feedback and sensor I/O of interface device 14. Microprocessor 26 can be provided with software instructions to wait for commands or requests from computer host 12, decode the command or request, and handle/control input and output signals according to the command or request. In addition, processor 26 preferably operates independently of host computer 12 by reading sensor signals and calculating appropriate forces from those sensor signals, time signals, and stored or relayed instructions selected in accordance with a host command. Suitable microprocessors for use as local microprocessor 26 include the MC68HC711E9 by Motorola, the PIC16C74 by Microchip, and the 82930AX by Intel Corp., for example. Microprocessor 26 can include one microprocessor chip, or multiple processors and/or co-processor chips, and/or digital signal processor (DSP) capability.

Microprocessor 26 can receive signals from sensors 28 and provide signals to actuators 30 of the interface device 14 in accordance with instructions provided by host computer 12 over bus 24. For example, in a preferred local control embodiment, host computer 12 provides high level supervisory commands to microprocessor 26 over bus 24, and microprocessor 26 manages low level force control loops to sensors and actuators in accordance with the high level commands and independently of the host computer 12. The force feedback system thus provides a host control loop of information and a local control loop of information in a distributed control system. This operation is described in greater detail in U.S. Pat. No. 5,734,373, incorporated herein by reference. Microprocessor 26 can also receive commands from any other input devices 39 included on interface apparatus 14, such as buttons, and provides appropriate signals to host computer 12 to indicate that the input information has been received and any information included in the input information. Local memory 27, such as RAM and/or ROM, can be coupled to microprocessor 26 in interface device 14 to store instructions for microprocessor 26 and store temporary and other data (and/or registers of the microprocessor 26 can store data). In addition, a local clock 29 can be coupled to the microprocessor 26 to provide timing data.

Sensors 28 sense the position, motion, and/or other characteristics of a user manipulandum 34 of the interface device 14 along one or more degrees of freedom and provide signals to microprocessor 26 including information representative of those characteristics. Rotary or linear optical encoders, potentiometers, photodiode or photoresistor sensors, velocity sensors, acceleration sensors, strain gauge, or other types of sensors can be used. Sensors 28 provide an electrical signal to an optional sensor interface 36, which can be used to convert sensor signals to signals that can be interpreted by the microprocessor 26 and/or host computer system 12. For example, these sensor signals can be used by the host computer to influence the host application program, e.g. to steer a race car in a game or move a cursor across the screen.

One or more actuators 30 transmit forces to the interface device 14 and/or to manipulandum 34 of the interface device 14 in response to signals received from microprocessor 26. In one embodiment, the actuators output forces on the housing of the interface device 14 which is handheld by the user, so that the forces are transmitted to the manipulandum through the housing. Alternatively or additionally, actuators can be directly coupled to the manipulandum 34. Actuators 30 can include two types: active actuators and passive actuators. Active actuators include linear current control motors, stepper motors, pneumatic/hydraulic active actuators, a torquer (motor with limited angular range), voice coil actuators, moving magnet actuators, and other types of actuators that transmit a force to move an object. Passive actuators can also be used for actuators 30, such as magnetic particle brakes, friction brakes, or pneumatic/hydraulic passive actuators. Active actuators are preferred in the embodiments of the present invention. Actuator interface 38 can be connected between actuators 30 and microprocessor 26 to convert signals from microprocessor 26 into signals appropriate to drive actuators 30, as is described in greater detail below.

Other input devices 39 can optionally be included in interface device 14 and send input signals to microprocessor 26 or to host processor 16. Such input devices can include buttons, dials, switches, levers, or other mechanisms. For example, in embodiments where the device 14 is a gamepad, the various buttons and triggers can be other input devices 39. Or, if the user manipulandum 34 is a joystick, other input devices can include one or more buttons provided, for example, on the joystick handle or base. Power supply 40 can optionally be coupled to actuator interface 38 and/or actuators 30 to provide electrical power. A safety switch 41 is optionally included in interface device 14 to provide a mechanism to deactivate actuators 30 for safety reasons.

Manipulandum (or "user object") 34 is a physical object, device or article that may be grasped (held in the hand between two or more fingers or in the palm) or otherwise contacted or controlled by a user and which is coupled to interface device 14. In some embodiments, the user 22 can manipulate and move the manipulandum along provided degrees of freedom to interface with the host application program the user is viewing on display screen 20. Manipulandum 34 in such embodiments can be a joystick, mouse, trackball, stylus (e.g. at the end of a linkage), steering wheel, sphere, medical instrument (laparoscope, catheter, etc.), pool cue (e.g. moving the cue through actuated rollers), hand grip, knob, button, or other object. Mechanisms can be used to provide degrees of freedom to the manipulandum, such as gimbal mechanisms, slotted yoke mechanisms, flexure mechanisms, etc. Various embodiments of suitable mechanisms are described in U.S. Pat. Nos. 5,767,839; 5,721,566; 5,623,582; 5,805,140; 5,825,308; and patent application Ser. Nos. 08/965,720, 09/058,259, 09/156,802, 09/179,382, and 60/133,208; all incorporated herein by reference.

In other embodiments, the haptic feedback can be output directly on the housing of a device, such as a handheld device. For example, the housing can be used for a gamepad, remote control, telephone, or other handheld device. In a gamepad embodiment, the housing of the gamepad can receive the vibrotactile feedback of the present invention, and a fingertip joystick or other control on the gamepad can be provided with separate haptic feedback, e.g. with motors coupled to the joystick mechanism to provide force feedback in the degrees of freedom of the joystick, and/or tactile feedback. Some gamepad embodiments may not include a joystick, so that manipulandum 34 can be a button pad or other device for inputting directions or commands to the host computer.

Controlling Force Feedback Vibrations Using Bi-Directional Motor Output

The present invention provides more control over vibrotactile feedback using an actuator having a moving mass. In existing implementations, the moving mass is rotated by a rotary actuator, as described below.

Figure 2A:
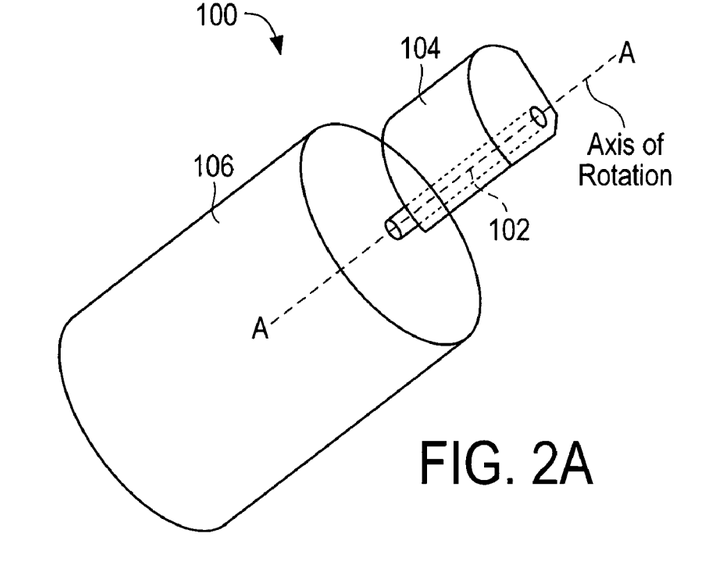
FIG. 2a is a perspective view of one embodiment of a motor having an eccentric mass that is rotated to provide vibrations to an interface device.

FIG. 2a is a graph illustrating a DC rotary motor 100 that can be included in a handheld controller 14 or coupled to manipulandum 34 as actuator 30 for providing force feedback to the user of the controller 14 and/or manipulandum 34. Motor 100 includes a shaft 102 that rotates about an axis A, and an eccentric mass 104 is rigidly coupled to the shaft 102 and thus rotates with the shaft about axis A. In one preferred embodiment, the housing 106 of the motor 100 is coupled to the housing of the interface device 14, e.g. the motor can be attached to the inside of the housing of a handheld gamepad or other controller. In other embodiments, the actuator can be coupled to a movable manipulandum, such as a joystick or mouse, or other member.

Figure 2B:
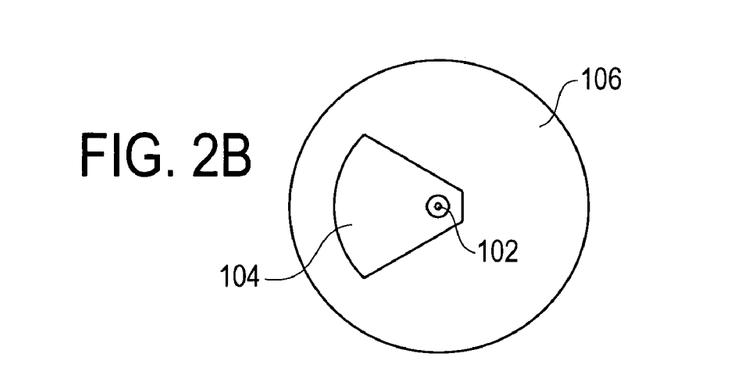
FIGS. 2b and 2c are top plan views of a motor and differently-shaped eccentric masses.
Figure 2C:
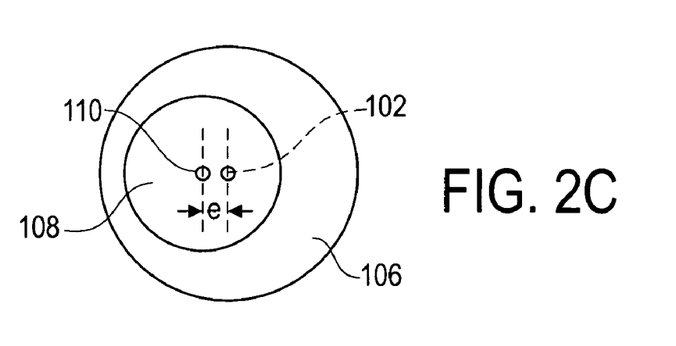

Many different types and shapes of eccentric masses 104 can be used. As shown in FIG. 2b, a wedge- or pie-shaped eccentric can be used, where one end of the eccentric is coupled to the shaft 102 so that most of the wedge extends to one side of the shaft. Alternatively, as shown in FIG. 2c, a cylindrical or other-shaped mass 108 can be coupled to the shaft 102. The center 110 of the mass 108 is positioned to be offset from the axis of rotation A of the shaft 102, creating an eccentricity parameter e that is determined by the distance between the axis of rotation of the shaft 102 and the center of mass of the mass 108. The e parameter can be adjusted in different device embodiments to provide stronger or weaker vibrations, as desired. For example, the radial force due to the unbalanced rotating mass is given by $F=m*w^2*e$, where m is the rotating mass, w is the angular velocity, and e is the eccentricity. This relationship predicts that greater magnitude is obtained by changing the eccentricity if the motor is driven constantly in one direction.

When the eccentric mass 104 is rotated by the motor 100, a vibration is induced in the motor and in any member coupled to the motor due to the off-balance motion of the mass. Since the housing 106 of motor 100 is preferably coupled to a housing of a controller or to a movable manipulandum, the vibration is transmitted to the user that is holding the housing or manipulandum. One or more of motors 100 can be included in a device 14 to provide vibrotactile or other haptic feedback; for example, two motors may be used to provide stronger magnitude vibrations and/or vibrations in two different directions.

Figure 3:
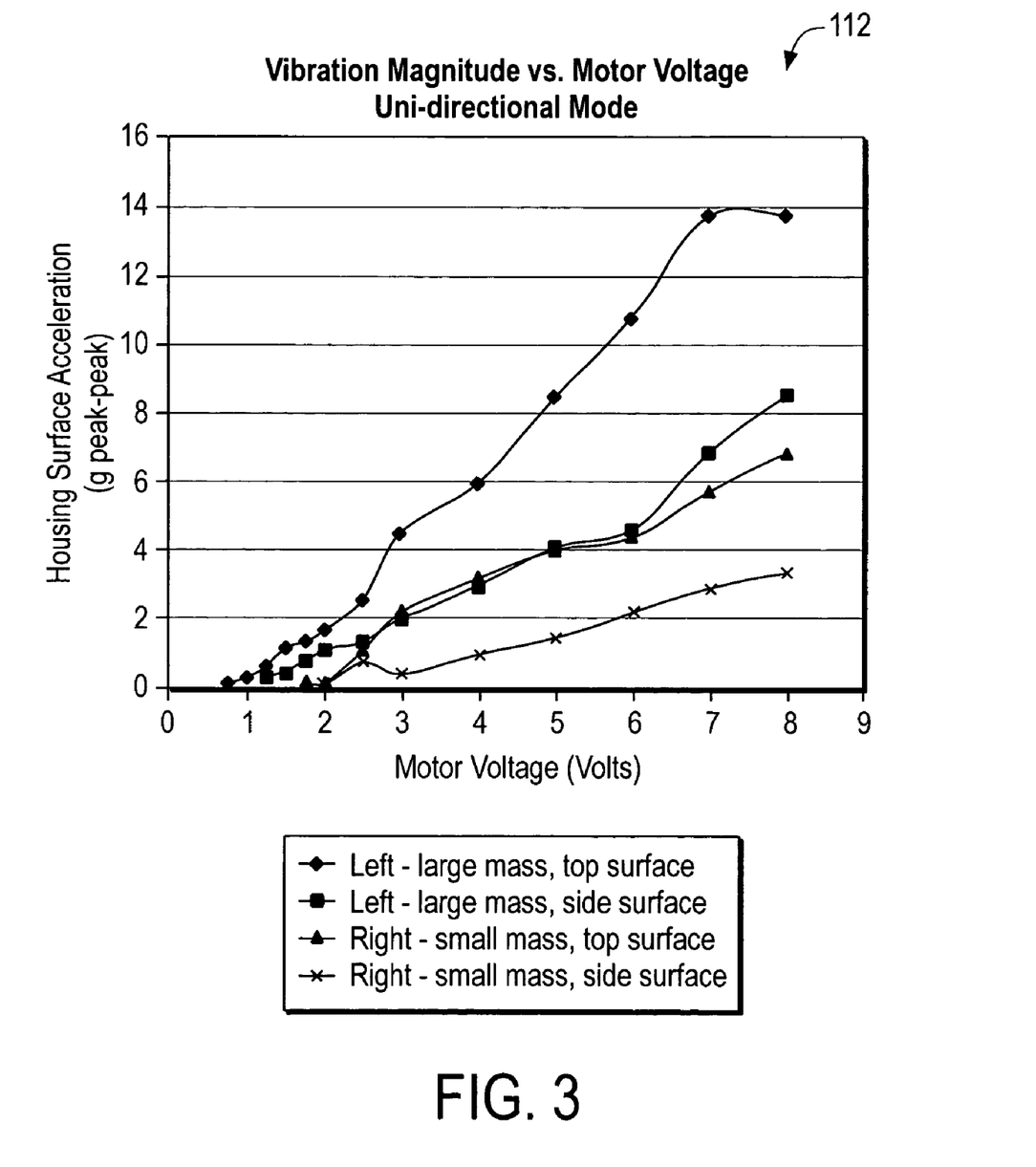
FIG. 3 is a graph illustrating a vibration magnitude vs. motor voltage for prior art devices.

FIG. 3 is a graph 112 illustrating a uni-directional mode of the motor 100. In this mode, the motor is controlled by a voltage value to rotate the eccentric mass in one direction about the axis of rotation of the shaft. For example, a local microprocessor can output a voltage directly to the motor, or an actuator interface can provide the desired voltage value to the motor 100. Typically, an on-off drive voltage signal is used, where the duty cycle of the drive signal indicates the actual voltage seen across the motor.

The graph 112 shows the relationship between voltage (the horizontal axis) and acceleration on the surface of the housing of the controller device 14 (the vertical axis). A top portion and a side portion of the housing are areas where the acceleration has been measured for this graph, as indicated by the different curves; in addition, a large eccentric mass and a smaller eccentric mass were used. The magnitude of acceleration is indicative of the magnitude of vibration as experienced by the user. As shown, the vibration increases in magnitude proportionally with the magnitude of voltage used to control the motor.

Prior art devices use the uni-directional mode to provide vibrotactile feedback to a controller held by the user. An advantage of this mode is that strong vibrations can be provided to the user.

Figure 4:
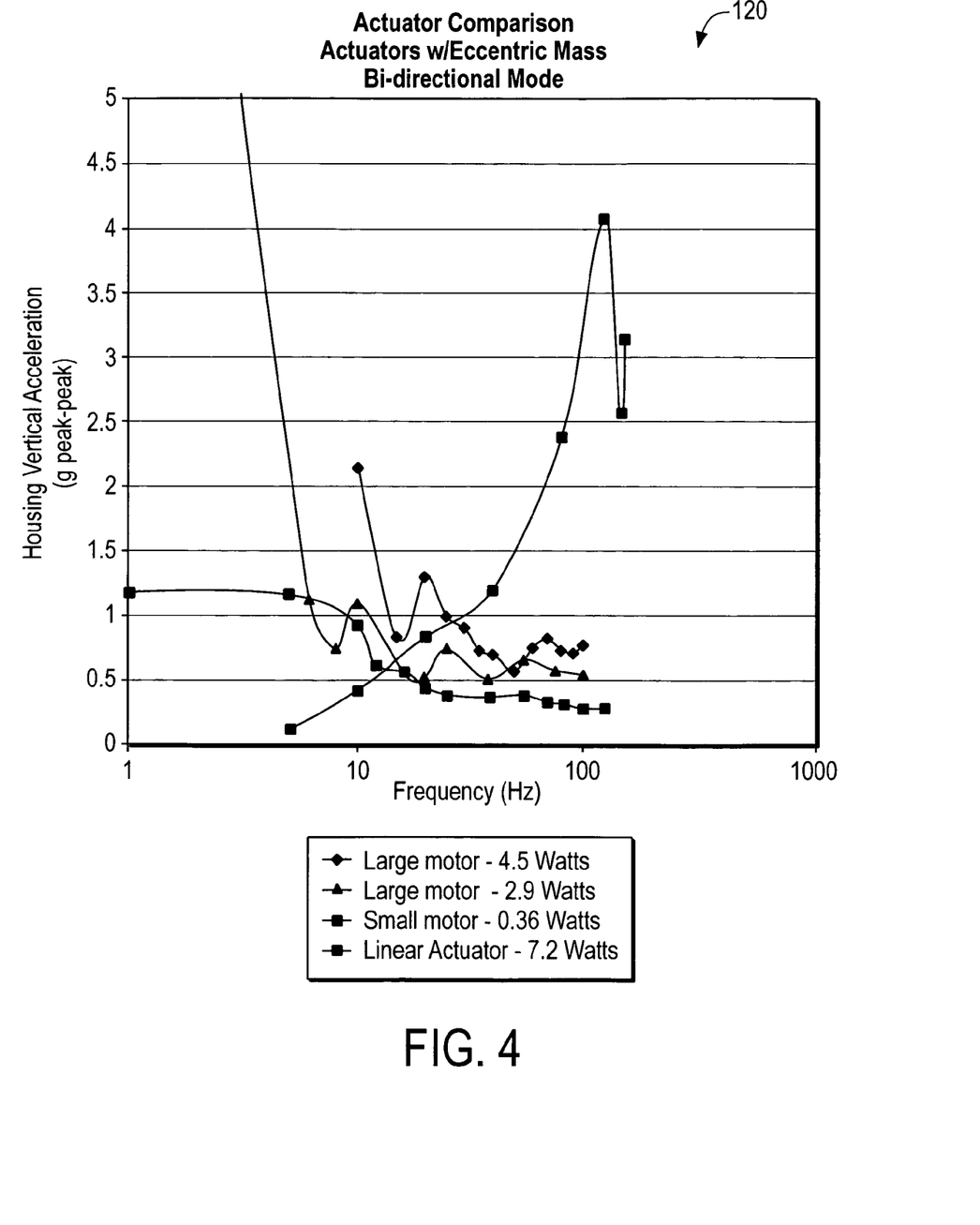
FIG. 4 is a graph illustrating a vibration magnitude vs. frequency of oscillation of the eccentric or drive signal.

FIG. 4 is a graph 120 illustrating the output results of a bi-directional mode of the present invention of the motor 100 for outputting vibrotactile feedback. In this mode, the motor is controlled by a drive waveform that changes between positive and negative signs, thereby changing the direction of rotation of the motor shaft 102 in accordance with the waveform. In the preferred method of operation, the eccentric mass 104 never completes a full rotation, but is instead controlled to oscillate approximately about a single point in its range of motion (a forced harmonic). The eccentric mass thus travels through only a portion of the full range of motion of the shaft before it changes direction and moves in the opposite direction. This causes a vibration in the motor and in any member or housing coupled to the motor as the mass is quickly moved back and forth. In practice, it has been found that a minimum frequency must be provided for the eccentric mass to oscillate about a single point; below that natural frequency of the eccentric mass, the mass will tend to shift about the rotational range of the actuator as it oscillates. The natural frequency is determined by the spring constant of the inherent cogging effect (reluctance force) of the motor.

Figure 5A:
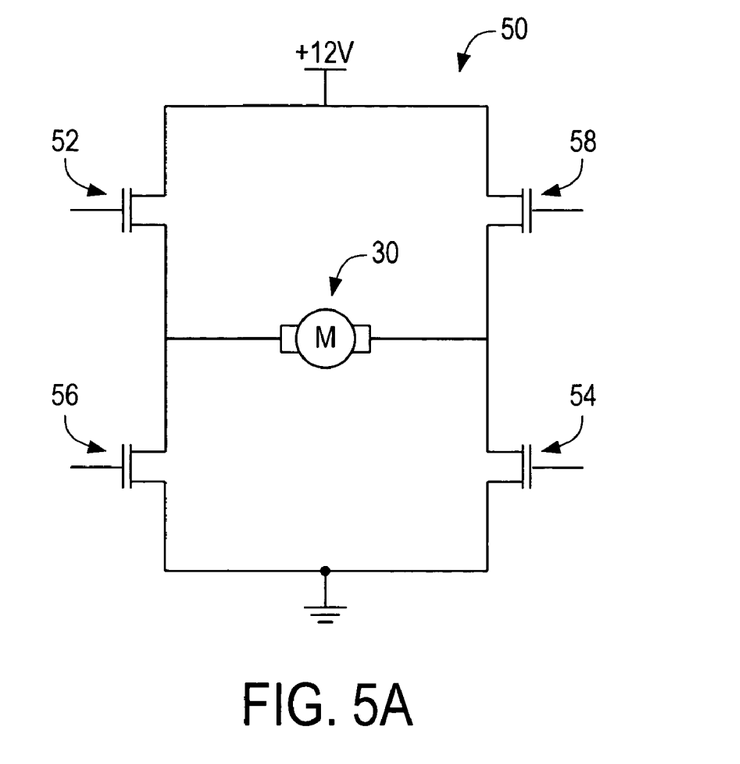
FIG. 5a is a schematic diagram illustrating a first example of a drive circuit which can be used to drive the actuator in bi-directional mode.

The graph 120 shows the relationship for several motors between frequency of oscillation of the eccentric or drive signal (the horizontal axis) and acceleration on the top surface of the housing of the controller device 14 (the vertical axis). As shown in the graph, for most of the motors shown, a higher frequency of oscillation causes a lower magnitude of vibration, while a lower frequency of oscillation causes a higher magnitude of vibration. The dynamic range of control is much greater in bi-directional mode than in uni-directional mode. The results shown in graph 120 were obtained using a current-controlled linear amplifier; however, a voltage controlled amplifier can also be used, and/or a switching amplifier can be used as shown in FIG. 5a. The drive waveform can be a current waveform or a voltage waveform, depending on the particular amplifier circuit and other circuitry used in a particular implementation.

The drive waveform can be supplied by a local controller or circuitry, such as microprocessor 26, by an actuator interface 38, or the host computer 12 can directly supply the voltage (using an amplifier) or a command to supply a desired voltage. For example, a force feedback driver program, API, or application program (or other software layer) running on the host computer can provide an actuator command having independently-controllable magnitude and frequency parameters, where the command is provided in response to an event or interaction in the graphical environment provided by the host. The local microprocessor or other circuitry can receive the command and parameters and, in response, provide a drive signal of the appropriate frequency or magnitude to the actuator(s). Alternatively, a host computer program can provide a drive signal directly to the device and actuator(s).

The curves shown in graph 120 are at a maximum amplitude of drive waveform for the motor (i.e. the maximum current which was used to drive the motors in the test resulting in graph 120). If a lower amplitude drive waveform is used, then the magnitude of vibration output is correspondingly lower. This allows the controller of the drive waveform to adjust the magnitude of vibration to a desired level within the allowed magnitude range by adjusting the current magnitude of the waveform. The controller can also adjust the frequency of the drive waveform independently of the amplitude of the drive waveform to adjust the frequency of vibration. This allows different frequency vibrations to be output independently of the magnitude of those vibrations, thereby providing a degree of control over the vibration that is not possible in uni-directional mode.

Although the maximum magnitude of vibration (acceleration) in bi-directional mode is less than the maximum vibration magnitude that can be output in uni-directional mode, the advantage of independently controllable magnitude and frequency of vibration allows a great many haptic feedback effects to be generated that are not possible in uni-directional mode. In uni-directional mode, a vibration can be made strong by increasing the voltage and thus the frequency of rotation of the eccentric mass. However, the strength of vibration must always be associated with a corresponding frequency, causing a similar feel to the user each time a particular-strength of vibration is output. In bi-directional mode, two vibrations may be of similar magnitude but completely different frequencies, or, have the same frequencies but different magnitudes. This creates a large variety of vibration sensations which can be output to the user.

In one optimized embodiment, both uni-directional mode and bi-directional mode are used in a single hybrid controller device 14. A motor 100 that is configured to operate in bi-directional mode may be able to operate in uni-directional mode, e.g. a voltage controlled bridge circuit may be able to drive the motor in both modes (a current-controlled motor is not as appropriate for uni-directional mode). In some embodiments, an amplifier that can operate as a voltage control amplifier for uni-directional mode and as a different amplifier (e.g. current controlled) for bi-directional mode can be used; or, two different amplifiers can be used which can be alternatively selected, where the appropriate amplifier is selected based on the current mode. Since uni-directional mode can offer vibrations of higher magnitude, this mode can be useful to generate very strong lower-frequency force feedback effects, e.g. explosions, collisions, etc. in a game displayed and implemented by the host computer. For example, a given actuator can be driven with voltage control in uni-directional mode to get large magnitude vibrations from 5 to 80 Hz. The controller (e.g. microprocessor 26) can then switch to bi-directional current control mode to produce high frequency vibrations. This multi-mode approach provides higher bandwidth that would not be possible in uni-directional mode and opens up a whole range of haptic feedback effects. Using this paradigm, for example, a 10 g 5 Hz vibration can be output in uni-directional mode followed by a high frequency decaying ringing to simulate loss of vehicle control followed by impact with a metal guardrail in a racing game implemented by the host computer. Other combinations of uni-directional vibrations and bi-directional vibrations can be provided. In other embodiments, one actuator in the device 14 operates in uni-directional mode, and another actuator can operate in bi-directional mode, allowing uni-directional vibrations to be output at different times or simultaneously.

The vibration effects described above can be greatly varied by changing the drive waveform. Software tools such as Immersion Studio™ from Immersion Corporation can be used to design and provide different vibration waveforms and to determine which output is best for a particular application.

FIG. 5a is a schematic diagram of a first example of a drive circuit 50 which can be used to drive actuator 30 (e.g., motor 100 or other type of actuator). This circuit allows the actuator to operate in bi-directional mode. The circuit can be included in the actuator interface 38 of FIG. 1, for example, or within microprocessor 26 or other circuitry.

Circuit 50 is a well-known H-bridge circuit that allows an input current or voltage to drive the actuator 30 in either direction by providing current or voltage in either direction through the actuator load. Transistors 52, 54, 56, and 58 are provided in the configuration shown and are used as switches to provide voltage or current in one of two directions through the motor 30 depending on the switched configuration. For example, transistors 52 and 54 can be switched on and transistors 56 and 58 can be switched off to provide current in one direction through the motor 30, and transistors 56 and 58 can be switched on while transistors 52 and 54 are switched off to provide current in the other direction through the motor 30. The operation of switching H-bridge circuits are well known to those skilled in the art. Either a voltage-controlled amplifier or a current-controlled amplifier circuit can be used. Other H-bridge switching circuits that use FET transistors can also be used in the present invention. One such switching circuit is disclosed copending Application No. 60/133,370, which is incorporated herein by reference.

Figure 5B:
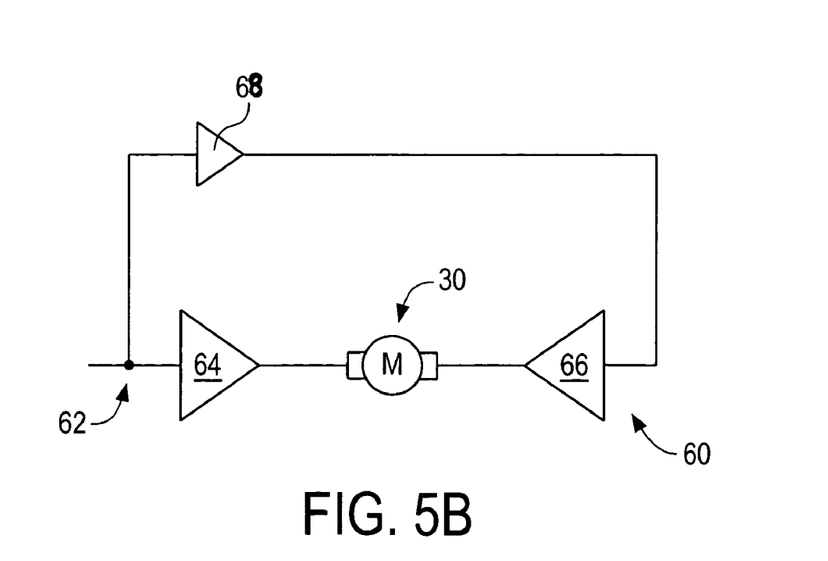
FIG. 5b is a schematic diagram illustrating a second example of a drive circuit which can be used to drive the actuator in bi-directional mode.

FIG. 5b is a diagram of a second example of a drive circuit 60 that can be used to drive actuator 30 in bi-directional mode. Circuit 60 allows an input current to drive the actuator 30 in either direction by providing current in either direction through the actuator load. An input signal is provided at node 62, and is amplified either by linear amplifier 64 or linear amplifier 66 depending on the direction of the current, where an inverter 68 inverts the signal for amplifier 66. Such functionality can be obtained with many commonly available linear amplifier integrated circuits. Any amplifier circuit which is capable of reversing drive current can be used to drive the motor in two directions.

In other embodiments of the present invention, yet other types of actuators can be used. For example, a solenoid having linear motion can be used to provide the bi-directional vibrations described above. Rotary or linear voice coil or moving magnet actuators can also be used.

While this invention has been described in terms of several preferred embodiments, it is contemplated that alterations, permutations and equivalents thereof will become apparent to those skilled in the art upon a reading of the specification and study of the drawings. Furthermore, certain terminology has been used for the purposes of descriptive clarity, and not to limit the present invention. It is therefore intended that the following appended claims include alterations, permutations, and equivalents as fall within the true spirit and scope of the present invention.

The invention claimed is:

1. A method, comprising:
   receiving a signal at a haptic feedback device, the haptic feedback device including an actuator, the actuator having a rotatable eccentric mass and defining an axis of rotation; and
   generating a bi-directional drive signal based on the received signal, the drive signal operative to control the actuator to oscillate the mass in two directions about the axis of rotation such that oscillation of the eccentric mass induces haptic feedback, wherein the mass is oscillated in the two directions for only a portion of a full rotation about the axis.

2. The method of claim 1, further comprising:
   controlling a magnitude and a frequency of the haptic feedback, the magnitude and frequency being decoupled from each other, by adjusting the bi-directional drive signal.

3. The method of claim 1, further comprising:
   outputting a high magnitude, low frequency vibration.

4. The method of claim 1, further comprising:
   outputting a high frequency vibration.

5. The method of claim 1, wherein receiving a signal includes receiving the signal from a computer, the signal is based on values associated with a graphical image on the computer.

6. The method of claim 1, further comprising:
   transmitting an input signal to the computer, the input signal being based on an indicator associated with manipulation of the haptic feedback device, the haptic feedback device being manipulable in at least two degrees of freedom.

7. The method of claim 1, wherein the drive signal is provided to the actuator via an H-bridge circuit.

8. The method of claim 1, wherein the eccentric mass is wedge-shaped.

9. A method, comprising:
   receiving an indication of at least one of an event and an interaction associated with a graphic environment;
   sending a bi-directional control signal to a haptic feedback device in response to the indication, the bi-directional control signal including a magnitude indication and a frequency indication, the bi-directional control signal being configured to cause the haptic feedback device to oscillate a mass in two directions with a magnitude associated with the magnitude indication and a frequency associated with the frequency indication, the mass being coupled to a rotary actuator, the mass being an eccentric mass that is configured to rotate about an axis of rotation of the actuator, wherein the mass is oscillated in the two directions for only a portion of a full rotation about the axis to output a haptic effect.

10. The method of claim 9, wherein the magnitude indication and the frequency indication are independently applicable.

11. The method of claim 9, wherein the control signal is configured to cause the haptic feedback device to control the magnitude of the mass oscillation independent of the frequency of the mass oscillation.

12. The method of claim 9, further comprising:
    outputting a high magnitude, low frequency vibrotactile effect in response to the sending the control signal.

13. A device, comprising:
    a rotary actuator defining an axis of rotation and having an eccentric mass coupled to the rotary actuator, said rotary actuator configured to rotate the eccentric mass about the axis of rotation; and
    a circuit coupled to said rotary actuator, said circuit configured to send a bi-directional drive signal to said rotary actuator, said rotary actuator configured to oscillate said mass about the axis of rotation in two directions in response to the bi-directional drive signal, wherein the mass is oscillated in the two directions for only a portion of a full rotation about the axis to output a haptic effect.

14. The device of claim 13, wherein said eccentric mass is offset from the axis of rotation.

15. The device of claim 13, wherein said circuit includes an H-bridge circuit configured to provide current in two directions to said rotary actuator.

16. The device of claim 13, wherein said circuit includes two linear amplifiers, each of said linear amplifiers is configured to amplify a signal to said rotary actuator in a different direction to cause said rotary actuator to be drivable in said two directions.

17. The device of claim 13, wherein said device is a gamepad controller, said gamepad controller is configured to receive a signal from a computer, the signal is operative to cause the output of the vibration based on data associated with a graphical environment implemented and displayed by the computer.

18. The device of claim 17, wherein said gamepad controller includes a joystick having two degrees of freedom, said joystick configured to provide input to the computer.

19. A method, comprising:
receiving a first indication at a haptic feedback device having a mass and an actuator defining an axis of rotation;
producing a first drive signal based on the first indication, the first drive signal operative to rotate a mass in one direction about the axis of rotation of the actuator, the first drive signal associated with a first vibration of the haptic feedback device;
receiving a second indication at the haptic feedback device; and
producing a second drive signal based on the second indication, the second drive signal operative to oscillate the mass in two directions about the axis of rotation of the actuator, the second drive signal associated with a second vibration of the haptic feedback device, wherein the mass is oscillated in the two directions for only a portion of a full rotation about the axis to produce the second vibration.

20. The method of claim 19, wherein a magnitude and a frequency of the second vibration are controlled independently from each other by adjusting a magnitude indicator and a frequency indicator associated with the second drive signal.

21. The method of claim 19, wherein the first vibration is output for high magnitude, low frequency vibrotactile effects, and the second vibration is output for high frequency vibrotactile effects.

* * * * *

UNITED STATES PATENT AND TRADEMARK OFFICE
CERTIFICATE OF CORRECTION

PATENT NO. : 7,656,388 B2  Page 1 of 1
APPLICATION NO. : 10/949467
DATED : February 2, 2010
INVENTOR(S) : Schena et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1403 days.

Signed and Sealed this

Thirtieth Day of November, 2010

David J. Kappos
*Director of the United States Patent and Trademark Office*